US008599159B2

(12) United States Patent
Sugeda et al.

(10) Patent No.: US 8,599,159 B2
(45) Date of Patent: Dec. 3, 2013

(54) TOUCH PANEL TYPE OPERATION DEVICE, TOUCH PANEL OPERATION METHOD, AND COMPUTER PROGRAM

(75) Inventors: Shigehiko Sugeda, Tokai (JP); Koichi Ushida, Okazaki (JP); Kazuyoshi Yamamoto, Sapporo (JP)

(73) Assignee: Aisin AW Co., Ltd., Anjo (JP)

( * ) Notice: Subject to any disclaimer, the term of this patent is extended or adjusted under 35 U.S.C. 154(b) by 162 days.

(21) Appl. No.: 13/232,423

(22) Filed: Sep. 14, 2011

(65) Prior Publication Data

US 2012/0068945 A1 Mar. 22, 2012

(30) Foreign Application Priority Data

Sep. 21, 2010 (JP) ................................. 2010-210741

(51) Int. Cl.
*G06F 3/041* (2006.01)
(52) U.S. Cl.
USPC .................... 345/173; 178/18.01; 715/702
(58) Field of Classification Search
USPC .................. 345/173–179; 178/18.01–18.09; 715/702, 786
See application file for complete search history.

(56) References Cited

U.S. PATENT DOCUMENTS

| 2008/0306683 A1 | 12/2008 | Ando et al. |
| 2010/0083167 A1 | 4/2010 | Kikuchi et al. |
| 2010/0201616 A1 | 8/2010 | Choi et al. |

FOREIGN PATENT DOCUMENTS

JP      A-2002-366286      12/2002

OTHER PUBLICATIONS

Feb. 7, 2012 European Search Report issued in EP 11 18 1296.

*Primary Examiner* — Amare Mengistu
*Assistant Examiner* — Premal Patel
(74) *Attorney, Agent, or Firm* — Oliff & Berridge, PLC

(57) ABSTRACT

Touch panel operation devices, methods, and programs set a touch-off determination time, and determine that the touch-off has occurred if the state at which the touch panel detects the user not touching the touch panel has continued for the set touch-off determination time or more after the touch-off was detected. When the user is touching the touch panel, the devices, methods, and programs acquire a touch coordinate, select an object corresponding to the acquired touch coordinate, and scroll-display the selected object based on a displacement of the acquired touch coordinate. The devices, methods, and programs determine whether the touch coordinate was acquired and displaced just before the touch-off was detected, and if the touch coordinate was acquired and displaced just before the touch-off was detected, set the touch-off determination time to be longer than if the touch coordinate was acquired and not displaced just before the touch-off was detected.

20 Claims, 10 Drawing Sheets

PRIOR ART

TOUCH PANEL TYPE OPERATION DEVICE, TOUCH PANEL OPERATION METHOD, AND COMPUTER PROGRAM

INCORPORATION BY REFERENCE

The disclosure of Japanese Patent Application No. 2010-210741, filed on Sep. 21, 2010, including the specification, drawings, and abstract thereof, is incorporated herein by reference in its entirety.

BACKGROUND

1. Related Technical Fields

Related technical fields include touch panel operation devices, touch panel operation methods, and computer programs for performing a selection operation of a selectable object using a touch panel.

2. Related Art

Conventionally, devices provided with a liquid crystal display such as in-vehicle navigation devices, portable information equipments including PDAs (Personal Digital Assistant) and cellular phones, portable music players, portable game devices, personal computers, and the like are likely to have a touch panel on the front face of the liquid crystal display to accept a user's operation. The devices provided with a touch panel display selectable objects such as buttons and the like on the liquid crystal display. If the devices detect that a user has touched the position corresponding to a displayed selectable object, the devices execute processing for selecting the selectable object In the processing for selecting the selectable object on the devices provided with the touch panel, the selectable object basically continues selected from when a "touch-on" where a state in which the user is not touching the touch panel transits to a state in which the user is touching the touch panel has been detected to when a "touch-off" where the state in which the user is touching the touch panel transits to the state in which the user is not touching the touch panel has been detected. A scroll operation of the selectable object can be executed by moving (dragging) the touching position with the selectable object continued selected.

The touch panel here employs a system such as a resistive system (a pressure sensitive system), a capacitance system, or the like. The touch-on and the touch-off are detected based on a change in pressure or capacitance generated when a part of the user's body (for example, a finger) or a pen has touched the touch panel. When performing the above-mentioned scroll operation, the finger of the user or the like may temporarily lift up from the touch panel against the user's intention or the pressure the touch panel is being pressed may be reduced while dragging. If the touch-off is determined in such case, the scroll may be stopped against the user's intention. The reason will be described below.

For example, FIG. 13 illustrates a scroll operation to scroll a map image 102 in a direction of an arrow 103 when the map image 102 displayed on a liquid crystal display 101 of a navigation device is being selected. In the scroll operation, the user performs a touch-on at a coordinate X1 displayed on the map image 102 and drags by moving the finger along the arrow 103. Here, if the finger of the user or the like temporarily lifts up from the touch panel or the pressure the touch panel is being pressed is reduced at a point X2 while dragging, the touch-off may be determined at the point X2. As a result, the selection of the map image 102 is canceled at the point X2 and the scroll is terminated. Further, a new touch-on is detected at a point X3 that is in the vicinity of the point X2.

Thereby, a button 104 placed in an area including the point X3 where the touch-on was detected is selected against the user's intention.

Especially, the above-mentioned problem is likely to occur in touch panels employing a resistive system. Because the touch-off is detected against the user's intention when the pressure the touch panel is pressed decreases, even if the finger of the user or the like continues touching the touch panel.

In order to solve the above-mentioned problem, the following method is considered. The touch-off is not determined immediately after the touch-off was detected. That is, after the touch-off was detected, if the touch-on is detected within a predetermined time period, the touch-off is not determined under the assumption that the selection continues. Only if the touch-on is not detected within the predetermined time period, the touch-off is determined. For example, Japanese Patent Application; Publication No. 2002-366286 discloses a technology that, in a key input processing device including a unit that detects ON/OFF of a key at a predetermined interval, an OFF of a key input is determined when two or more OFFs have been sequentially detected.

SUMMARY

In the conventional technology, there is a problem that, when setting a certain time period (hereinafter, referred to as "touch-off determination time") to determine a touch-off after the touch-off has been detected, it is difficult to set the touch-off determination time to an appropriate time period. That is, when the touch-off determination time is set long, the time period to determine the touch-off becomes long. Then, in a case where the user intentionally touches off the screen, the operability can be worsened. On the other hand, when the touch-off determination time is set short, it is not possible to solve the problems regarding scroll stop and/or a selection of a selectable object against the user's intention as described above.

Exemplary implementations of the broad inventive principles described herein provide a touch panel operation device, a touch panel operation method, and a computer program that are capable of setting the most appropriate touch-off determination time based on the user's operation manner on the touch panel, thereby avoiding the worsening of the operability as well as preventing the scroll stop and/or the selection of selectable object against the user's intention.

Exemplary implementations provide: a display device (15) that displays a selectable object (61, 64 to 68); a touch panel (14) that is placed on a display area of the display device and accepts a touch operation of a user; a touch-on detection unit (36) that detects a touch-on where a state in which the user is not touching the touch panel transits to a state in which the user is touching the touch panel; a touch-off detection unit (37) that detects a touch-off where the state in which the user is touching the touch panel transits to the state in which the user is not touching the touch panel; a touch-off determination time setting unit (38) that sets a touch-off determination time; a touch-off determination unit (39) that determines the touch-off if the state in which the user is not touching the touch panel has continued for the touch-off determination time or more after the touch-off was detected by the touch-off detection unit; a touch coordinate acquisition unit (40) that, if the user is touching the touch panel, acquires a touch coordinate that is a coordinate of a point where the user has touched; a selection unit (41) that selects the selectable object corresponding to the touch coordinate acquired by the touch coordinate acquisition unit; a scroll-display unit (42) that scroll-displays on the display device the selectable object being selected by the selection unit, based on a displacement of the touch coordinate acquired by the touch coordinate acquisition unit; and a displacement judgment unit (43) that judges whether the touch coordinate acquired by the touch coordinate acquisition unit just before the touch-off was detected by the touch-off detection unit is displaced, wherein the touch-off determination time setting unit, if the displacement judgment unit has judged that the touch coordinate acquired by the touch coordinate acquisition unit just before the touch-off was detected is displaced, sets the touch-off determination time longer than if the displacement judgment unit has judged that the touch coordinate acquired by the touch coordinate acquisition unit just before the touch-off was detected is not displaced.

The "just before the touch-off was detected" corresponds to, for example, a predetermined time before the touch-off was detected, a time period of touch coordinate detection for a predetermined number of times before the touch-off was detected if the detection of the touch coordinate is performed at a predetermined interval, and the like.

According to exemplary implementations, the touch panel operation device includes a displacement amount acquisition unit (44) that acquires a displacement amount of the touch coordinate acquired by the touch coordinate acquisition unit (40) just before the touch-off was detected by the touch-off detection unit (37), wherein the touch-off determination time setting unit sets the touch-off determination time based on the displacement amount acquired by the displacement amount acquisition unit.

According to exemplary implementations, the touch-off determination time setting unit (38) sets the touch-off determination time longer as the displacement amount acquired by the displacement amount acquisition unit (44) is larger.

According to exemplary implementations, a touch-off area judgment unit (45) that, if the touch-off has been detected by the touch-off detection unit (37), judges whether the touch coordinate acquired by the touch coordinate acquisition unit (40) when the touch-off was detected is located in a predetermined area in the display area, wherein the touch-off determination time setting unit (38), if the touch-off area judgment unit has judged that the touch coordinate is located in the predetermined area, sets the touch-off determination time longer than if the touch-off area judgment unit has judged that the touch-coordinate is not located in the predetermined area.

The "predetermined area" corresponds to, for example, an area where a function that the user does not intend can be executed if the touch-off is determined, such as an area where a selectable object different from the selectable object currently being selected is located.

According to exemplary implementations, the touch panel operation device includes: a touch-on area judgment unit (46) that, if the touch-on has been detected by the touch-on detection unit (36), judges whether the touch coordinate acquired by the touch coordinate acquisition unit when the touch-on was detected is located in the predetermined area in the display area; and a function execution unit (47) that, if the touch-on area judgment unit has judged that the touch coordinate is located in the predetermined area, executes a predetermined function corresponding to the predetermined area.

According to exemplary implementations, a touch panel operation method includes the steps of: detecting a touch-on where a state in which a user is not touching a touch panel (14) transits to a state in which the user is touching the touch panel, the touch panel being placed on a display area of a display device (15) that displays a selectable object (61, 64 to 68) and accepting a touch operation of the user; detecting a touch-off where the state in which the user is touching the touch panel transits to the state in which the user is not touching the touch panel; setting a touch-off determination time; determining the touch-off if the state in which the user is not touching the touch panel has continued for the touch-off determination time or more after the touch-off was detected at the touch-off detection step; acquiring, if the user is touching the touch panel, a touch coordinate that is a coordinate of a point where the user has touched; selecting the selectable object corresponding to the touch coordinate acquired at the coordinate acquisition step; scroll-displaying on the display device the selectable object being selected at the selection step, based on a displacement of the touch coordinate acquired at the coordinate acquisition step; and judging whether the touch coordinate acquired at the coordinate acquisition step just before the touch-off was detected at the touch-off detection step is displaced; wherein at the touch-off determination time setting step, if it has been judged at the displacement judgment step that the touch coordinate acquired at the coordinate acquisition step just before the touch-off was detected is displaced, the touch-off determination time is set longer than if it has been judged at the displacement judgment step that the touch coordinate acquired at the coordinate acquisition step just before the touch-off was detected is not displaced.

According to exemplary implementations, a computer program causes a computer to execute the functions of: detecting a touch-on where a state in which a user is not touching a touch panel (14) transits to a state in which the user is touching the touch panel, the touch panel being placed on a display area of a display device (15) that displays a selectable object (61, 64 to 68) and accepting a touch operation of the user; detecting a touch-off where the state in which the user is touching the touch panel transits to the state in which the user is not touching the touch panel; setting a touch-off determination time; determining the touch-off if the state in which the user is not touching the touch panel has continued for the touch-off determination time or more after the touch-off was detected by the touch-off detection function; acquiring, if the user is touching the touch panel, a touch coordinate that is a coordinate of a point where the user has touched and storing the touch coordinate in a storage medium (52); selecting the selectable object corresponding to the touch coordinate acquired by the coordinate acquisition function; scroll-displaying on the display device the selectable object being selected by the selection function, based on a displacement of the touch coordinate acquired by the coordinate acquisition function; judging whether the touch coordinate acquired by the coordinate acquisition function just before the touch-off was detected by the touch-off detection function is displaced, wherein the touch-off determination time setting function, if the displacement judgment function has judged that the touch coordinate acquired by the coordinate acquisition function just before the touch-off was detected is displaced, sets the touch-off determination time longer than if the displacement judgment function has judged that the touch coordinate acquired by the coordinate acquisition function just before the touch-off was detected is not displaced.

According to exemplary implementations, the most appropriate touch-off determination time can be set based on the operation manner of the user on the touch panel. As a result, in a normal situation, the touch-off determination time from the touch-off detection to the touch-off determination is never set longer than necessary, thereby not leading to the worsening of the operability. In addition, in a situation in which the touch-off that the user does not intend is likely to be detected, the touch-off determination time from the touch-off detection to the touch-off determination is set longer. Therefore, it is possible to prevent the stop of the scroll-display and/or the selection of the selectable object that the user does not intend.

According to exemplary implementations, the most appropriate touch-off determination time can be set based on the displacement amount of the touch coordinate just before the touch-off. As a result, for example, in a situation in which the touch-off that the user does not intend is likely to be detected, the touch-off determination time from the touch-off detection to the touch-off determination is set longer. Therefore, it is possible to prevent the stop of the scroll-display and/or the selection of the selectable object that the user does not intend. In addition, the most appropriate touch-off determination time can be set based on the scroll-display speed of the selectable object. Therefore, it is possible to smoothly scroll-display the selectable object even when the touch-off is detected during scroll-display.

According to exemplary implementations, the touch-off determination time is set longer as the displacement amount of the touch coordinate just before the touch-off is larger. Therefore, for example, in a situation in which the touch-off that the user does not intend is likely to be detected such as a drag operation at a high speed, the touch-off determination time from the touch-off detection to the touch-off determination can be set longer. As a result, it is possible to prevent the stop of the scroll-display and/or the selection of the selectable object that the user does not intend. In addition, the touch-off determination time is set longer as the scroll-display speed of the selectable object is faster. Therefore, even if the touch-off has been detected during scroll-display, it is possible to smoothly scroll the selectable object without the scroll-display being stopped before the touch-off is determined.

According to exemplary implementations, when a predetermined area where the operation that the user intends can be interrupted by determining the touch-off is included in the display area, if the touch-off is detected in the predetermined area, the touch-off determination time from the touch-off detection to the touch-off determination is set longer. Therefore, it is possible to decrease the possibility that disadvantages to the user are created.

According to exemplary implementations, if the touch-off is detected in the predetermined area where the predetermined function that the user does not intend can be executed based on the touch-on after the touch-off determination, the touch-off determination time from the touch-off detection to the touch-off determination is set longer. Therefore, it is possible to prevent the predetermined function that the user does not intend from being executed.

According to exemplary implementations, the most appropriate touch-off determination time can be set based on the operation manner of the user on the touch panel. As a result, in a normal situation, the touch-off determination time from the touch-off detection to the touch-off determination is never set longer than necessary, thereby not leading to the worsening of the operability. In addition, in a situation in which the touch-off that the user does not intend is likely to be detected, the touch-off determination time from the touch-off detection to the touch-off determination is set longer. Therefore, it is possible to prevent the stop of the scroll-display and/or the selection of the selectable object that the user does not intend.

According to exemplary implementations, the most appropriate touch-off determination time can be set based on the operation manner of the user on the touch panel. As a result, in a normal situation, the touch-off determination time from the touch-off detection to the touch-off determination is never set longer than necessary, thereby not leading to the worsening of the operability. In addition, in a situation in which the touch-off that the user does not intend is likely to be detected, the touch-off determination time from the touch-off detection to the touch-off determination is set longer. Therefore, it is possible to prevent the stop of the scroll-display and/or the selection of the selectable object that the user does not intend.

DETAILED DESCRIPTION OF EXEMPLARY IMPLEMENTATIONS

Figure 1:
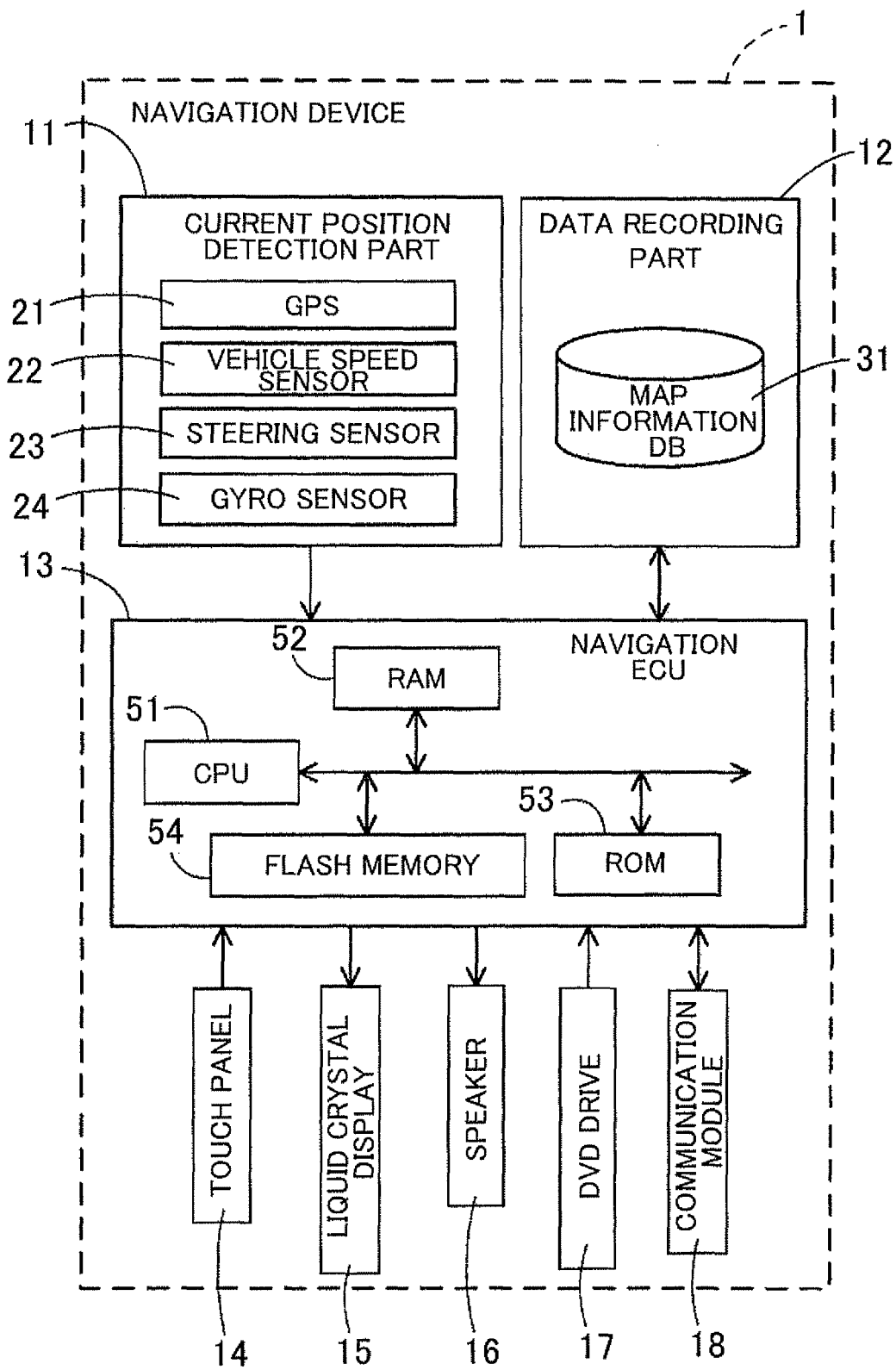
FIG. 1 is a block diagram showing a navigation device according to the present example

Hereinafter, a specific example of a touch panel operation device according to the present example that is implemented in a navigation device will be explained in detail with reference to the drawings. First, a schematic structure of a navigation device 1 according to the present example will be explained with reference to FIG. 1. FIG. 1 is a block diagram showing the navigation device 1 according to the present example.

As shown in FIG. 1, the navigation device 1 according to the present example is composed by: a current position detection part 11 that detects a current position of a vehicle mounted with the navigation device 1; a data recording part 12 in which various kinds of data is recorded; a navigation ECU 13 that performs an arithmetic processing based on input information; a touch panel 14 that accepts an operation of a user; a liquid crystal display 15 that displays to the user a map of the vicinity of the vehicle, a facility search screen, and the like; a speaker 16 that outputs audio guidance regarding route guidance; a DVD drive 17 that reads out a DVD serving as a storage medium; a communication module 18 that performs communication with information centers such as a probe center, a VICS® center, and the like.

Hereinafter, the respective components composing the navigation device 1 are explained.

The current position detection part 11 includes at least one of a GPS 21, a vehicle speed sensor 22, a steering sensor 23, a gyro sensor 24, and the like, and can detect a current position and a direction of the vehicle, a traveling speed of the vehicle, a current time, and the like. Here, in particular, the vehicle speed sensor 22 is a sensor for detecting a moving distance and a speed of the vehicle, generates pulses in accordance with a rotation of drive wheels of the vehicle, and outputs pulse signals to the navigation ECU 13. Subsequently, by counting the number of generated pulses, the navigation ECU 13 calculates a rotation speed of the drive wheels and the moving distance. Note that the navigation device 1 is not required to be provided with all the aforementioned four kinds of sensors, and the navigation device 1 may be provided with only one or a plurality of kinds of sensors among them.

The data recording part 12 is provided with a hard disk (not shown) serving as an external storage device and a recording medium, and a recording head (not shown) serving as a driver for reading a map information DB 31, a predetermined program, and the like, which are recorded in the hard disk, and writing predetermined data in the hard disk. The data recording part 12 may be composed by a memory card, or an optical disk such as a CD, a DVD, and the like, in place of the hard disk.

The map information DB 31 is a storage unit storing, for example, link information regarding roads (links), node information regarding node points, facility information regarding facilities, map display information for displaying a map, intersection information regarding respective intersections, route search information for searching for routes, point search information for searching for points, and the like.

Figure 2:
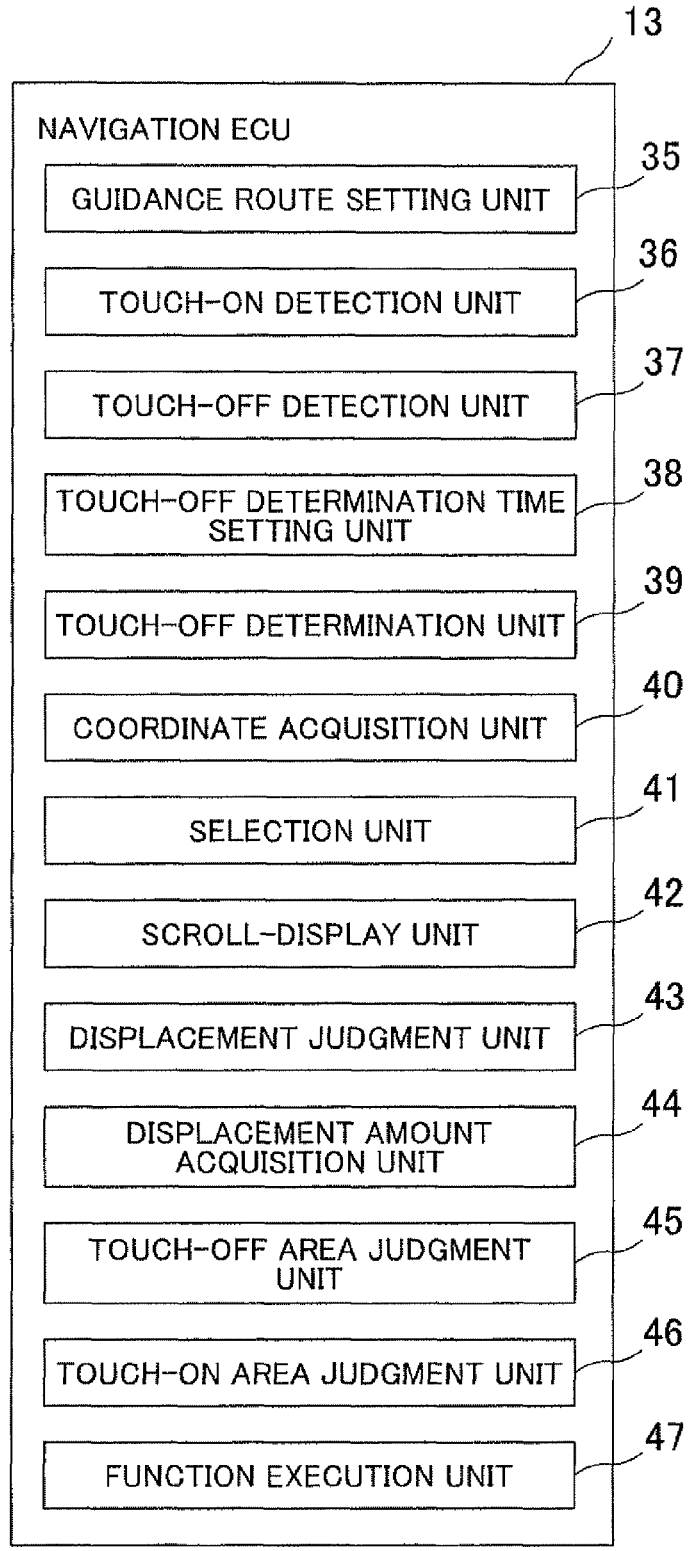
FIG. 2 shows a structure of a navigation ECU.

On the other hand, a controller (e.g., navigation ECU (an electronic control unit) 13) serves as a guidance route setting unit 35, a touch-on detection unit 36, a touch-off detection unit 37, a touch-off determination time setting unit 38, a touch-off determination unit 39, a touch coordinate acquisition unit 40, a selection unit 41, a scroll-display unit 42, a displacement judgment unit 43, a displacement amount acquisition unit 44, a touch-off area judgment unit 45, a touch-on area judgment unit 46, and a function execution unit 47, as shown in FIG. 2. The guidance route setting unit 35 sets a guidance route from a departure point to a destination. The touch-on detection unit 36 detects a touch-on where a state in which the user is not touching the touch panel 14 transits to a state in which the user is touching the touch panel 14. The touch-off detection unit 37 detects a touch-off where the state in which the user is touching the touch panel 14 transits to the state in which the user is not touching the touch panel 14. The touch-off determination time setting unit 38 that sets a touch-off determination time. The touch-off determination unit 39 determines the touch-off if the state in which the user is not touching the touch panel 14 has continued for the touch-off determination time or more after the touch-off was detected. The touch coordinate acquisition unit 40, if the user is touching the touch panel 14, acquires a touch coordinate that is a coordinate of a point where the user has touched. The selection unit 41 selects a selectable object corresponding to the touch coordinate. The scroll-display unit 42 scroll-displays on the liquid crystal display 15 the selectable object (such as a map image and a scroll bar) being selected, based on a displacement of the touch coordinate. The displacement judgment unit 43 judges whether the touch coordinate just before the touch-off was detected is displaced. The displacement amount acquisition unit 44 acquires a displacement amount of the touch coordinate just before the touch-off was detected. The touch-off area judgment unit 45, if the touch-off has been detected, judges whether the touch coordinate acquired by the touch coordinate acquisition unit 40 when the touch-off was detected is located in a predetermined area (for example, on a button) in a display area of the liquid crystal display 15. The touch-on area judgment unit 46, if the touch-on has been detected, judges whether the touch coordinate acquired by the touch coordinate acquisition unit 40 when the touch-on was detected is located in the predetermined area in the display area of the liquid crystal display 15. The function execution unit 47, if the touch-on area judgment unit 46 has judged that the touch coordinate is located in the predetermined area, executes a predetermined function corresponding to the predetermined area. The navigation ECU 13 is an electronic control unit that performs overall control of the navigation device 1. The navigation ECU 13 is provided with: a CPU 51 serving as a computing device and a control device; internal storage devices such as a RAM 52 used as a working memory when the CPU 51 executes various computing processing and in which route data when the route has been searched, a touch coordinate history queue described later (refer to FIG. 6), and the like, are stored, a ROM 53 which records a program for control, and a touch coordinate acquisition processing program (refer to FIG. 5), a touch-off provisional determination processing program (refer to FIG. 7), a touch-off determination processing program (refer to FIG. 10) and a touch-on detection processing program (refer to FIG. 11), and a flash memory 54 which records a program read from the ROM 53; and the like.

The touch panel 14 is placed in front of the display area of the liquid crystal display 15, and is operated to scroll-display the map image, select a button placed in the display area, or the like. The navigation ECU 13 detects, based on a detected signal outputted from the touch panel 14 through an operation on the touch panel 14, a "touch-on" where the state in which the user is not touching the touch panel 14 transits to the state in which the user is touching the touch panel 14 and a "touch-off" where the state in which the user is touching the touch panel 14 transits to the state in which the user is not touching the touch panel 14. In addition, the navigation ECU 13 detects a "touch coordinate" that is a coordinate of a point where the user has touched and a "displacement of the touch coordinate" if the user moves (that is, drags) a touching position with a selectable object such as the map image, a button, or the like being selected. Further, the navigation ECU 13 performs control so as to execute various kinds of operations corresponding to the detected touch operation, the touch coordinate, and the like. The touch panel 14 can employ a resistive system (a pressure sensitive system), in which the touch operation, the touch coordinate, and the like are detected based on a pressing pressure, a capacitance system in which the touch operation, the touch coordinate, and the like are detected based on a change in the capacitance, or the like.

In addition, on the liquid crystal display 15, the map image including roads, traffic information, operation guidance, an operation menu, key guidance, an expected travel route from the departure point to the destination, guidance information along the expected travel route, news, weather forecast, time, a mail, television programs, and the like are displayed. Further, the liquid crystal display 15 is utilized to display information regarding a point retrieved by a point search. Here, FIG. 3 shows an example of a travel guidance screen 60 shown on the liquid crystal display 15 while the vehicle is traveling.

Figure 3:
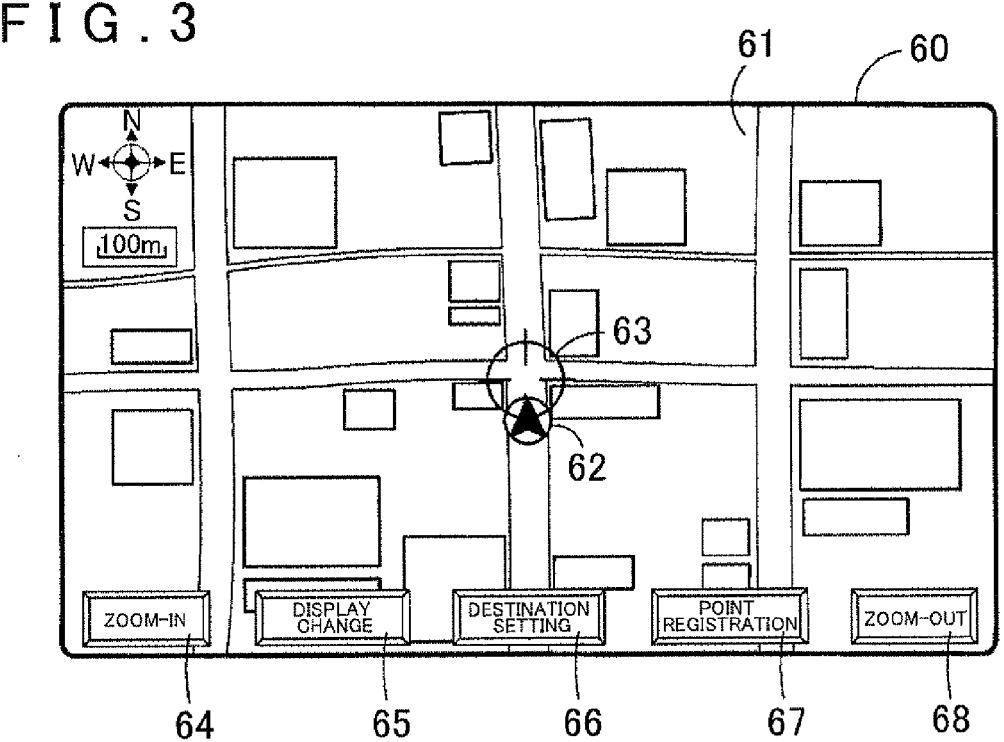
FIG. 3 shows an example of a travel guidance screen shown on a liquid crystal display while a vehicle is traveling.

As shown in FIG. 3, on the travel guidance screen 60 displayed on the liquid crystal display 15, a map image 61 of the vicinity of the current position of the vehicle, a current position mark 62 representing the current position of the vehicle matched on the map, a center cursor 63 identifying a center position of the display area of the map, various kinds of buttons 64 to 68 to be selected in order to execute predetermined functions on the navigation device 1. FIG. 3 shows the travel guidance screen 60 in a case where the map is displayed in a scale of 1/10000. The user is able to recognize facilities and road shapes of the vicinity of the current vehicle (including the guidance route if the guidance route is set) by referring to the travel guidance screen 60. In addition, the map scale can be changed to a larger scale (for example, a scale of 1/5000) by selecting a ZOOM-IN button 64 through a touch-on. In addition, a display manner (a bird view, a plain view, a nose-up view, a north-up view, ant the like) of the map image 61 can be changed by selecting a display change button 65 through a touch-on. The point indicated by the center cursor 63 can be set as a destination by selecting a destination setting button 66 through a touch-on. The point indicated by the center cursor 63 can be registered as a registered point in the navigation device 1 by selecting a point registration button 67 through a touch-on. The map scale can be changed to a smaller scale (for example, a scale of 1/20000) by selecting a ZOOM-OUT button 68 through a touch-on.

Figure 4:
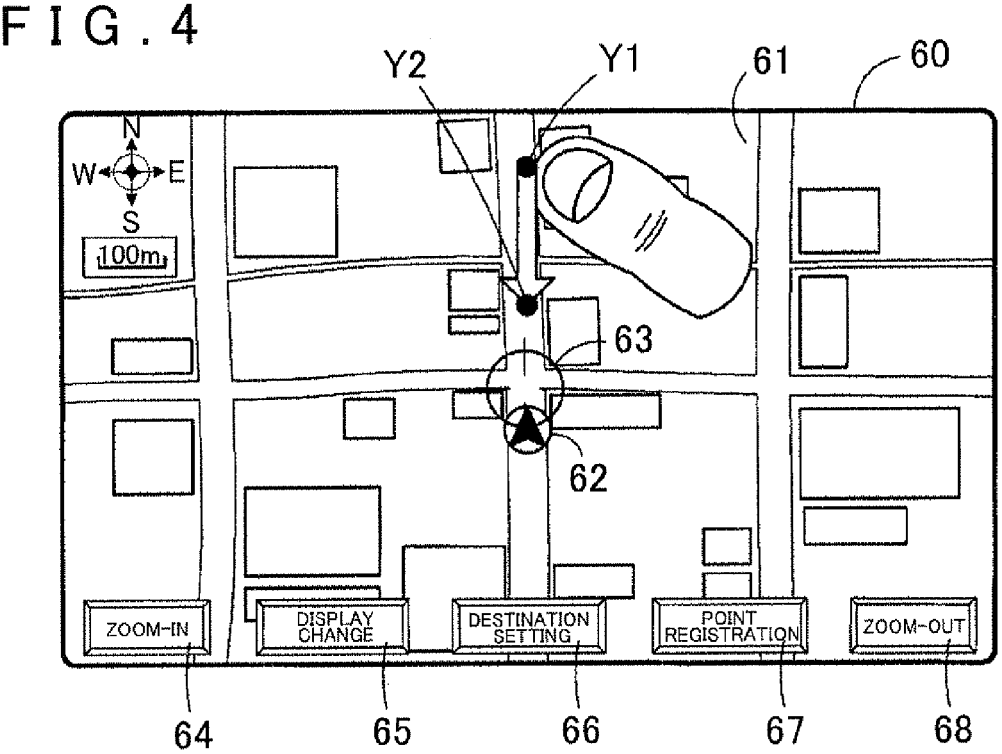
FIG. 4 shows an operation manner to scroll-display a map image displayed in the travel guidance screen.

When the travel guidance screen 60 is displayed, the user may desire to recognize the facilities and the road shapes out of the area displayed in the travel guidance screen 60. In such a case, the map scale can be changed to a smaller scale, or the map image can be scroll-displayed. To scroll-display the map image, as shown in FIG. 4, the user selects the map image 61 through a touch-on on the map image 61 and drags by moving his or her finger in a direction (for example, a downward direction in FIG. 4) to scroll with the map image 61 being selected. For example, if the user performs a touch-on at a point Y1 and drags to a point Y2, as shown in FIG. 4, the map image 61 is scroll-displayed upward for a distance from the point Y1 to the point Y2. As a result, the map of a different area can be displayed on the travel guidance screen 60.

The speaker 16 outputs audio guidance for traveling the guidance route based on an instruction from the navigation ECU 13, and the traffic information. In addition, the speaker 16 is utilized to output information regarding facilities retrieved by a facility search.

The DVD drive 17 is a drive capable of reading data stored in the recording medium such as a DVD, a CD, and the like. The DVD drive 17 plays music and images and updates the map information DB 31 based on the read data. In place of the DVD drive 17, a HDD and/or a memory card reader may be provided.

The communication module 18 is a communication device for receiving the traffic information including congestion information, regulation information, traffic accident information, and the like, which is transmitted from a traffic information center such as a VICS (a registered trademark: Vehicle Information and Communication System) center, a probe center, and the like. The communication module 18 corresponds to a cellular phone and a DCM for example.

Next, the touch coordinate acquisition processing method will be described with respect to the algorithms shown in FIGS. 5, 7, 10, and 11. The exemplary method may be implemented, for example, by one or more components of the above-described navigation device 1. For example, the exemplary method may be implemented by the ECU 13 and/or CPU 51 executing a computer program based on the algorithms stored in the ROM 53 and/or RAM 52. However, even though the exemplary structure of the above-described navigation device 1 may be referenced in the description, it should be appreciated that the structure is exemplary and the exemplary method need not be limited by any of the above-described exemplary structure.

The touch coordinate acquisition processing algorithm/program can be repeatedly executed at a predetermined interval (for example, at intervals of 0.2 sec.) after an ACC (i.e., an accessory power supply) of the vehicle turned on and, if the user is touching the touch panel 14, acquires the touch coordinate that is a coordinate of a point where the user has touched.

First, in the touch coordinate acquisition processing program, at Step (hereinafter, referred to as S) 1, the CPU 51 acquires, based on a detected signal transmitted from the touch panel 14, the touch coordinate that is a coordinate of a point where the user has touched. For example, if the touch panel 14 employs the resistive system or the capacitance system, the CPU 51 detects the touch coordinate by detecting the position of the electric current passed, based on the change in pressure or static electricity amount of the point touched by the user.

Next, at S2, the CPU 51 judges whether the touch coordinate could be acquired by the processing at S1. Note that the touch coordinate is acquired at S1 while the user is touching the touch panel 14 (especially, in case of the resistive system, while the user is touching the touch panel 14 by a pressure of a predetermined value or more).

If it has been judged that the touch coordinate could be acquired by the processing at S1 (S2: YES), the procedure proceeds to S3. On the other hand, if it has been judged that the touch coordinate could not be acquired by the processing at S1 (S2: NO), that is, if the user is not touching the touch panel 14, or if the user is touching the touch panel 14 by a pressure of less than the predetermined value, the CPU 51 terminates the touch coordinate acquisition processing program without storing the touch coordinate.

Figures 5, 6:
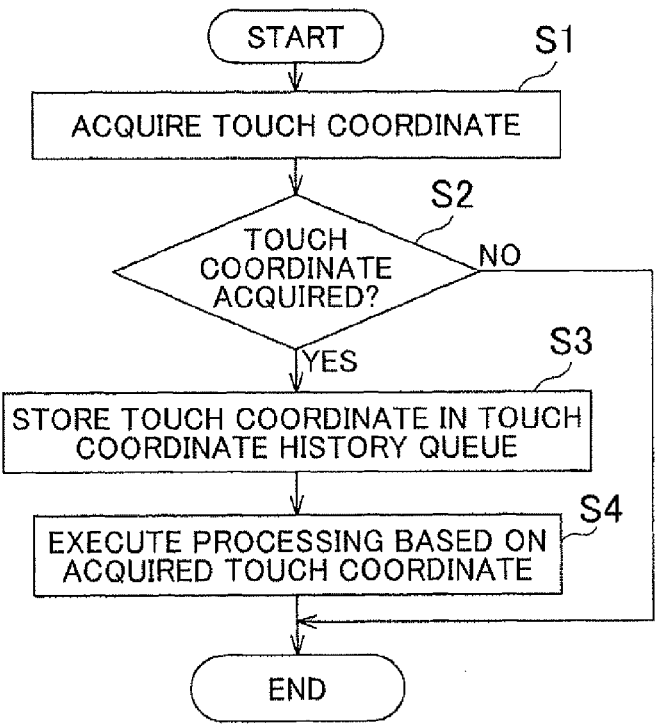
FIG. 5 is a flow chart of a touch coordinate acquisition processing algorithm according to the present example.
FIG. 6 is a schematic structure of a touch coordinate history queue.

At S3, the CPU 51 stores the touch coordinate acquired by the processing at S1 in the touch coordinate history queue provided in the RAM 52. In the touch coordinate history queue, the data of the touch coordinates for the last predetermined number of times (for example, four times) is stored. FIG. 6 is a schematic structure of the touch coordinate history queue. As shown in FIG. 6, when the data of, in the order of older data first, touch coordinates A, B, C, and D is stored in the touch coordinate history queue as the data of the touch coordinates for the last four times, if a touch coordinate E is newly acquired, the data of the touch coordinate A, which was acquired earliest, is deleted, and the data of the touch coordinate E is newly stored in the touch coordinate history queue. In addition, as described later, if the touch-off has been determined, or if a new selectable object has been selected based on the touch-on, the touch coordinate history queue is initialized (S35, S46).

Thereafter, at S4, the CPU 51 executes each processing based on the touch coordinate acquired by the processing at S1. For example, if the touch coordinate is displaced, the CPU 51 executes a display control processing (a scroll-display processing of the map image if the map image is selected, and a moving-display processing of an icon if the icon is selected) of the selectable object based on the displacement amount of the touch coordinate. Thereafter, the CPU terminates the touch coordinate acquisition processing program.

Figure 7:
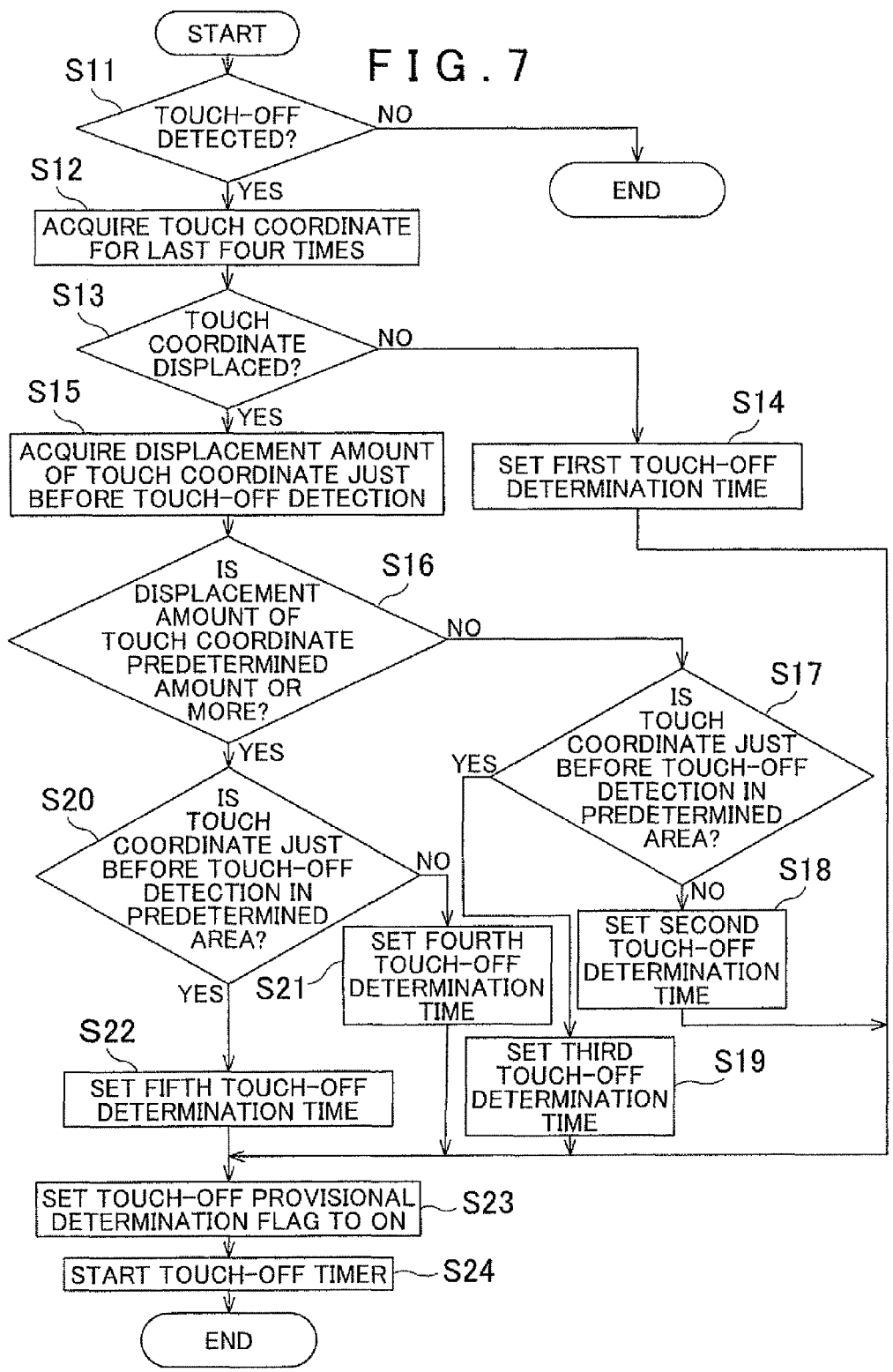
FIG. 7 is a flow chart of a touch-off provisional determination processing algorithm according to the present example.

Next, a touch-off provisional determination processing program, which is executed by the navigation ECU 13 in the navigation device 1, is explained with reference to FIG. 7. FIG. 7 is a flow chart of the touch-off provisional determination processing program according to the present example. The touch-off provisional determination processing program is a program that is repeatedly executed at a predetermined interval (for example, at intervals of 20 ms) after the ACC of the vehicle turned on and, if the touch-off has been detected, sets various kinds of conditions for determining a touch-off later.

Figure 8:
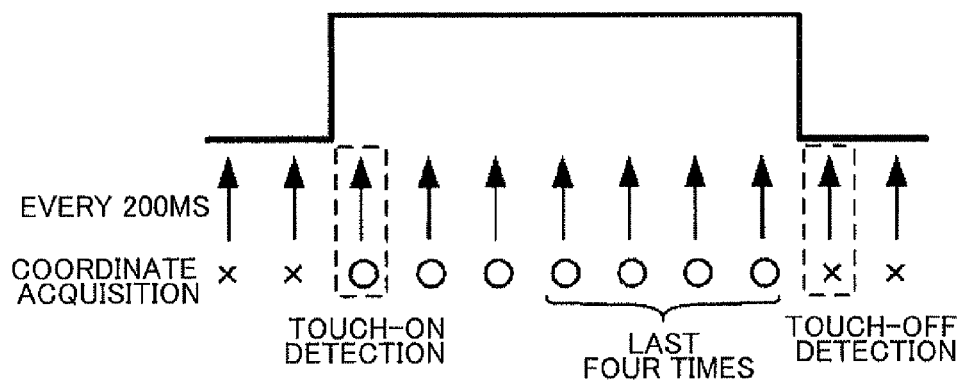
FIG. 8 shows a detection manner of a touch-on and a touch-off.

First, in the touch-off provisional determination processing program, at S11, the CPU 51 judges based on the detected signal transmitted from the touch panel 14 whether the touch-off where the state in which the user is touching the touch panel 14 transits to the state in which the user is not touching the touch panel 14 was detected. More specifically, as shown in FIG. 8, in the above-mentioned touch coordinate acquisition processing program executed at a predetermined interval (FIG. 5), the touch-off is detected if a touch coordinate has been acquired in the previous processing and a touch coordinate has not been acquired in the current processing.

If it has been judged that the touch-off was detected (S11: YES), the procedure proceeds to S12. On the other hand, if it has been judged that the touch-off was not detected (S11: NO), the CPU 51 terminates the touch-off provisional determination processing program and recognizes that the selectable object currently selected continues selected. If a drag operation is being performed, the scroll-display processing, the moving-display processing, or the like is performed (S4).

At S12, the CPU 51 reads out the touch coordinate history queue (FIG. 6) from the RAM 52 and acquires the touch coordinates for the last predetermined number of times (for example, for four times), which are stored as the touch coordinate history queue (that is, the touch coordinates acquired for 0.8 sec before the touch-off was detected in case of four times).

Thereafter, at S13, the CPU 51 judges whether the touch coordinate is displaced just before (for example, for 0.8 sec. before) the touch-off was detected, based on the touch coordinates for the last four times acquired at S12. Specifically, if the touch coordinates for the last four times are not within a predetermined margin of error (for example, ±5%), the CPU 51 judges that the touch coordinate is displaced for 0.8 sec. before the touch-off was detected. On the other hand, if all the touch coordinates for the last four times are within the predetermined margin of error (for example, ±5%), the CPU 51 judges that the touch coordinate is not displaced for 0.8 sec. before the touch-off was detected. The case where the touch coordinate is displaced corresponds to a case where the user is performing a drag operation, a flick operation, and the like. The time serving as a judgment criterion at S13 may be a time other than 0.8 sec. before the touch-off was detected. For example, the time serving as the judgment criterion at S13 may be the time corresponding to the touch coordinates for the last five times, which are stored as the touch coordinate history queue (for 1 sec. before the touch-off was detected) or the time corresponding to the touch coordinates for the last three times, which are stored as the touch coordinate history queue (for 0.6 sec. before the touch-off was detected).

If it has been judged that the touch coordinate is displaced just before (for example, for 0.8 sec. before) the touch-off was detected (S13: YES), the procedure proceeds to S15. On the other hand, if it has been judged that the touch coordinate is not displaced just before (for example, for 0.8 sec. before) the touch-off was detected (S13: NO), that is, if the touch position was fixed before the touch-off was detected, the procedure proceeds to S14.

At 514, the CPU 51 sets, as the touch-off determination time, a first touch-off determination time (for example, 0.4 sec.). Thereafter, the procedure proceeds to S23. The touch-off determination time is a time serving as a criterion to determine the touch-off. If the state in which the user is not touching the touch panel 14 has continued for the touch-off determination time or more after the touch-off was detected, as described later, the CPU 51 determines the touch-off (S34). The set touch-off determination time is stored in the RAM 52 or the like.

On the other hand, at S15, the CPU 51 acquires a displacement amount of the touch coordinate just before (for example, for 0.8 sec. before) the touch-off was detected, based on the touch coordinates for the last four times acquired at S12. Specifically, the total of differences between the consecutive coordinates in the touch coordinates for the last four times (touch coordinates B and C, C and D, and D and E in the example shown in FIG. 6) will be the displacement amount of the touch coordinate for 0.8 sec. before the touch-off was detected. In addition, the acquired displacement amount of the touch coordinate is proportional to a movement speed of the touch position just before the touch-off was detected. If the scroll-display processing is being performed before the touch-off, the acquired displacement amount of the touch coordinate is also proportional to a scroll speed.

At S16, the CPU 51 judges whether the displacement amount of the touch coordinate just before (for example, for 0.8 sec. before) the touch-off was detected is a predetermined amount or more. If the scroll-display processing is being performed just before the touch-off, the CPU 51 judges whether the scroll speed is a predetermined speed or more. In addition, the time serving as a judgment criterion at S16 may be a time other than 0.8 sec. before the touch-off was detected. For example, the time serving as the judgment criterion at S16 may be the time corresponding to the touch coordinates for the last five times, which are stored as the touch coordinate history queue (for 1 sec. before the touch-off was detected) or the time corresponding to the touch coordinates for the last three times, which are stored as the touch coordinate history queue (for 0.6 sec. before the touch-off was detected).

If it has been judged that the displacement amount of the touch coordinate just before (for example, for 0.8 sec. before) the touch-off was detected is the predetermined amount or more (S16: YES), the procedure proceeds to S20. On the other hand, if it has been judged that the displacement amount of the touch coordinate just before (for example, for 0.8 sec. before) the touch-off was detected is less than the predetermined amount (S16: NO), the procedure proceeds to S17.

Figure 9:
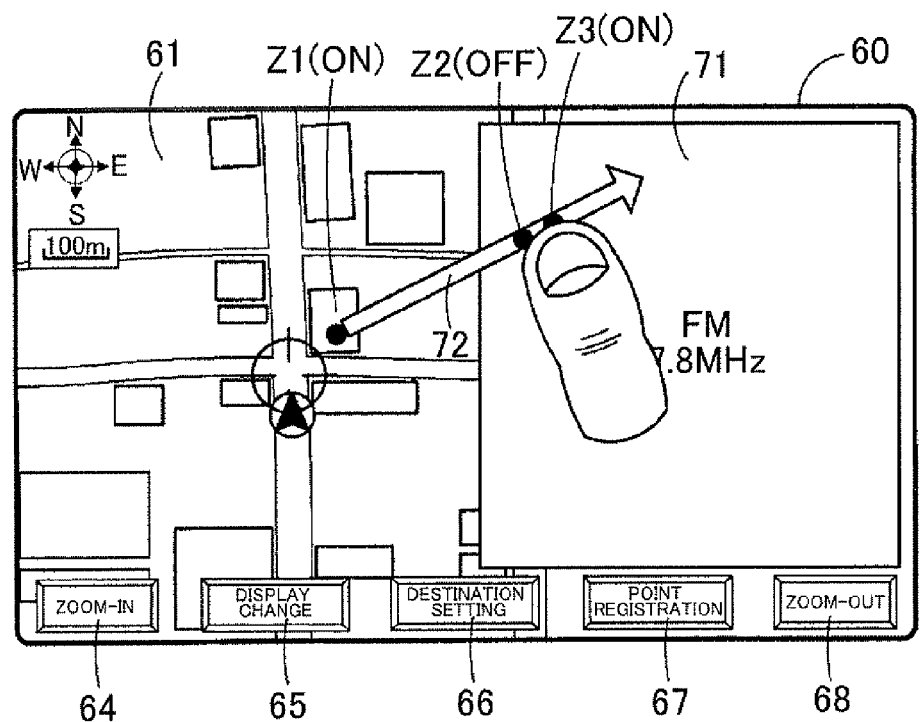
FIG. 9 shows the travel guidance screen when scroll-displaying the map image.

At S17, the CPU 51 judges whether the touch coordinate acquired just before the touch-off was detected (i.e., when the touch-off was detected) is located in a predetermined area in the display area of the liquid crystal display 15. The predetermined area is an area where a function that the user does not intend can be executed if the touch-off is determined while scrolling, such as an area where a selectable object different from the selectable object currently being selected is located. For example, if the selectable object currently being selected is the map image 61 as shown in FIG. 9, the areas where buttons 64 to 68 and 71 are located correspond to the predetermined area. The navigation device 1 is configured such that, even if the touch coordinate is moved onto these buttons 64 to 68 and 71 while scrolling the map image 61, the buttons 64 to 68 and 71 are not selected and scrolling the map image 61 continues unless the touch-on is newly detected on these buttons.

If it has been judged that the touch coordinate acquired just before the touch-off was detected is located in the predetermined area in the display area of the liquid crystal display 15 (S17: YES), the procedure proceeds to S19. On the other hand, if it has been judged that the touch coordinate acquired just before the touch-off was detected is not located in the predetermined area in the display area of the liquid crystal display 15 (S17: NO), the procedure proceeds to S18.

At S18, the CPU 51 sets, as the touch-off determination time, a second touch-off determination time (for example, 0.6 sec.), which is longer than the first touch-off determination time. The set touch-off determination time is stored in the RAM 52 or the like. Thereafter, the procedure proceeds to S23.

On the other hand, at S19, the CPU 51 sets, as the touch-off determination time, a third touch-off determination time (for example, 0.8 sec.), which is longer than the second touch-off determination time. The set touch-off determination time is stored in the RAM 52 or the like. Thereafter, the procedure proceeds to S23.

At S20, the same judgment processing as S17 is performed. If it has been judged that the touch coordinate acquired just before the touch-off was detected is located in the predetermined area in the display area of the liquid crystal display 15 (S20: YES), the procedure proceeds to S22. On the other hand, if it has been judged that the touch coordinate acquired just before the touch-off was detected is not located in the predetermined area in the display area of the liquid crystal display 15 (S20: NO), the procedure proceeds to S21.

At S21, the CPU 51 sets, as the touch-off determination time, a forth touch-off determination time (for example, 1 sec.), which is longer than the third touch-off determination time. The set touch-off determination time is stored in the RAM 52 or the like. Thereafter, the procedure proceeds to S23.

At S22, the CPU 51 sets, as the touch-off determination time, a fifth touch-off determination time (for example, 1.2 sec), which is longer than the forth touch-off determination time. The set touch-off determination time is stored in the RAM 52 or the like. Thereafter, the procedure proceeds to S23.

At S16 to S22, if it has been judged that the displacement amount of the touch coordinate is the predetermined amount or more, the touch-off determination time is set longer than if the displacement amount of the touch coordinate is less than the predetermined amount. However, the touch-off determination time may be set longer as the displacement amount of the touch coordinate is larger. For example, the touch-off determination time may be set in proportion to the displacement amount of the touch coordinate.

Next, at S23, the CPU 51 reads out a "touch-off provisional determination flag" from the RAM 52 and sets to ON. The "touch-off provisional determination flag" is a flag indicating a state in which the touch-off was detected but not determined (that is, a touch-off provisionally-determined state), and is OFF at default setting. The "touch-off provisional determination flag" is set to OFF if the touch-off has been determined or the touch-on has been detected before the touch-off is determined, as described later.

Subsequently, at S24, the CPU 51 starts a measurement of a touch-off timer. The CPU 51 determines the touch-off if the state in which the user is not touching the touch panel 14 (a state in which the touch-on is not detected) has continued till the touch-off determination time set at any of S14, S18, S19, S21, and S22 passes, as described later.

Figure 10:
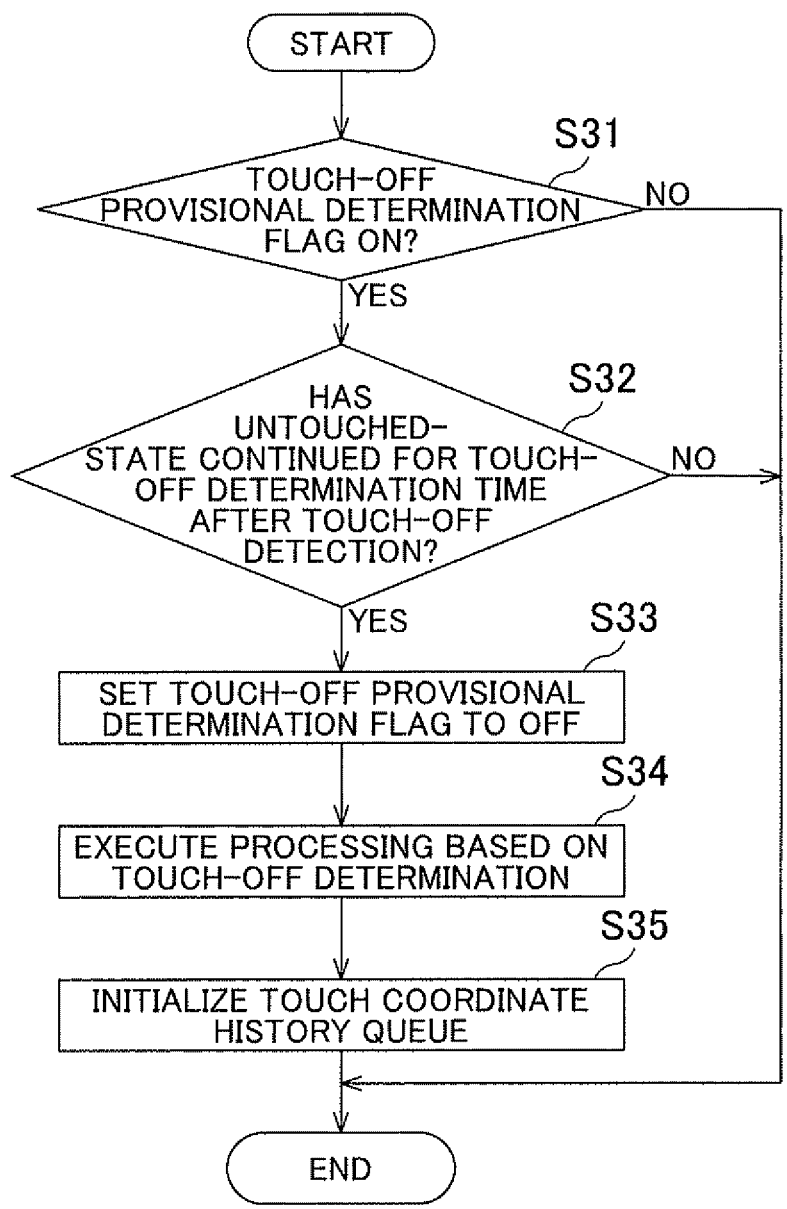
FIG. 10 is a flow chart of a touch-off determination processing algorithm according to the present example.

Next, the touch-off determination processing program, which is executed by the navigation ECU 13 in the navigation device 1, is explained with reference to FIG. 10. FIG. 10 is a flow chart of the touch-off determination processing program according to the present example. The touch-off determination processing program is a program that is repeatedly executed at a predetermined interval (for example, at intervals of 20 msec.) after the ACC of the vehicle turned on, judges whether the condition for determining the touch-off after the touch-off was detected was met, and determines the touch-off based on the judgment result.

First, in the touch-off determination processing program, at S31, the CPU 51 reads out the "touch-off provisional determination flag" from the RAM 52 and judges whether the "touch-off provisional determination flag" is set to ON. The "touch-off provisional determination flag" is set to ON (S23) when the touch-off was detected in the above-mentioned touch-off provisional determination processing program (FIG. 7).

If it has been judged that the "touch-off provisional determination flag" is set to ON (S31: YES), the procedure proceeds to S32. On the other hand, if it has been judged that the "touch-off provisional determination flag" is set to OFF (S31: NO), the CPU 51 terminates the touch-off determination processing program.

At S32, the CPU 51 acquires a value of the touch-off timer that has started the measurement at S24, and judges whether the state in which the user is not touching the touch panel 14 (the state in which the touch-on is not detected) has continued till the value of the touch-off timer reaches the touch-off determination time set at any of S14, S18, S19, S21, and S22. The touch-off timer starts the measurement when the touch-off was detected (S24). Therefore, at S32, the CPU 51 judges whether the state in which the user is not touching the touch panel 14 has continued for the touch-off determination time or more after the touch-off was detected. The state in which the user is not touching the touch panel 14 (the state in which the touch-on is not detected) corresponds to a state in which a touch coordinate is not acquired in the touch coordinate acquisition processing program (FIG. 5) to be executed at the above-mentioned predetermined interval. Consequently, especially, in case of the touch panel 14 employing a resistive system touch panel, the touch coordinate cannot be acquired if the pressure is less than a predetermined pressure even when the touch panel is being touched. Such case corresponds to the state in which the user is not touching (the state in which the touch-on is not detected).

If it has been judged that the state in which the user is not touching the touch panel 14 has continued for the touch-off determination time or more after the touch-off was detected (S32: YES), the procedure proceeds to S33. On the other hand, if it has been judged that the state in which the user is not touching the touch panel 14 has not continued for the touch-off determination time or more after the touch-off was detected (S32: NO), the CPU 51 terminates the touch-off determination processing program without determining the touch-off.

At S33, the CPU 51 reads out the "touch-off provisional determination flag" from the RAM 52 and sets the "touch-off provisional determination flag" to OFF.

Next, at S34, the CPU 51 determines the touch-off and performs various kinds of processings based on the determination of the touch-off. For example, the CPU 51 performs processing for canceling the selected status of the selectable object, for stopping the scroll-display or the moving-display of the selectable object if a drag operation is being performed, or the like.

Subsequently, at S35, the CPU 51 initializes the touch coordinate history queue (FIG. 6) of the RAM 52 along with the determination of the touch-off.

Figure 11:
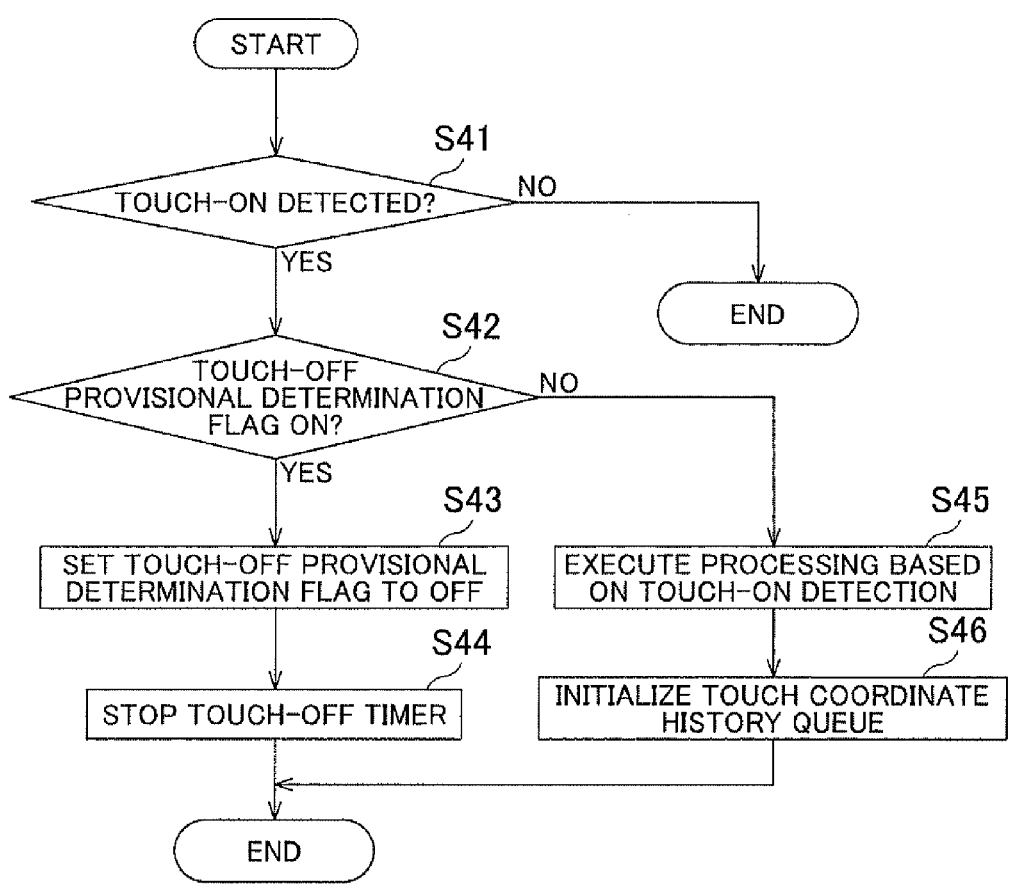
FIG. 11 is a flow chart of a touch-on detection processing algorithm according to the present example.

Next, the touch-on detection processing program, which is executed by the navigation ECU 13 in the navigation device 1, is explained with reference to FIG. 11. FIG. 11 is a flow chart of the touch-on detection processing program according to the present example. The touch-on detection processing program is a program that is repeatedly executed at a predetermined interval (for example, at intervals of 20 msec.) after the ACC of the vehicle turned on and, if the touch-on is detected, performs various kinds of processings based on the touch-on.

First, in the touch-on detection processing program, at S41, the CPU 51 judges based on the detected signal transmitted from the touch panel 14 whether the touch-on where the state in which the user is not touching the touch panel 14 transits to the state in which the user is touching the touch panel 14 was detected. Specifically, the touch-on is detected if a touch coordinate was not acquired in the previous processing and a touch coordinate was acquired in the current processing in the touch coordinate acquisition processing program (FIG. 5), which is executed at the above-mentioned predetermined interval, as shown in FIG. 8.

If it has been judged that the touch-on was detected (S41: YES), the procedure proceeds to S42. On the other hand, if it has been judged that the touch-on was not detected (S41: NO), the CPU 51 terminates the touch-on detection processing program.

At S42, the CPU 51 reads out the "touch-off provisional determination flag" from the RAM 52 and judges whether the "touch-off provisional determination flag" is set to ON. The "touch-off provisional determination flag" is set to ON (S23) if the touch-off has been detected in the above-mentioned touch-off provisional determination processing program (FIG. 7).

If it has been judged that the "touch-off provisional determination flag" is to set to ON (S42: YES), the procedure proceeds to S43. On the other hand, if it has been judged that the "touch-off provisional determination flag" is set to OFF (S42: NO), the procedure proceeds to S45.

At S43, the CPU 51 reads out the "touch-off provisional determination flag" from the RAM 52 and sets the "touch-off provisional determination flag" to OFF. That is, based on that the touch-on was detected before the touch-off is determined, the CPU 51 cancels the touch-off provisionally-determined state and maintains the selected state of the selectable object. In addition, if the drag operation was being performed, the CPU 51 continues the processing of the scroll-display or the moving-display of the selectable object.

Thereafter, at S44, the CPU 51 stops the measurement of the touch-off timer, and terminates the touch-on detection processing program.

On the other hand, at S45, the CPU 51 executes various kinds of processings based on the detection of the touch-on. For example, the CPU 51 selects a new selectable object corresponding to the touch coordinate, and if the selectable object thus selected is a button, executes a function (for example, a scale change of the map image, a destination setting, or the like) corresponding to the button.

Subsequently, at S46, the CPU 51 initializes the touch coordinate history queue (FIG. 6) of the RAM 52 as a new selectable object was selected based on the touch-on. Thereafter, the CPU terminates the touch-on detection processing program.

Figure 12A:
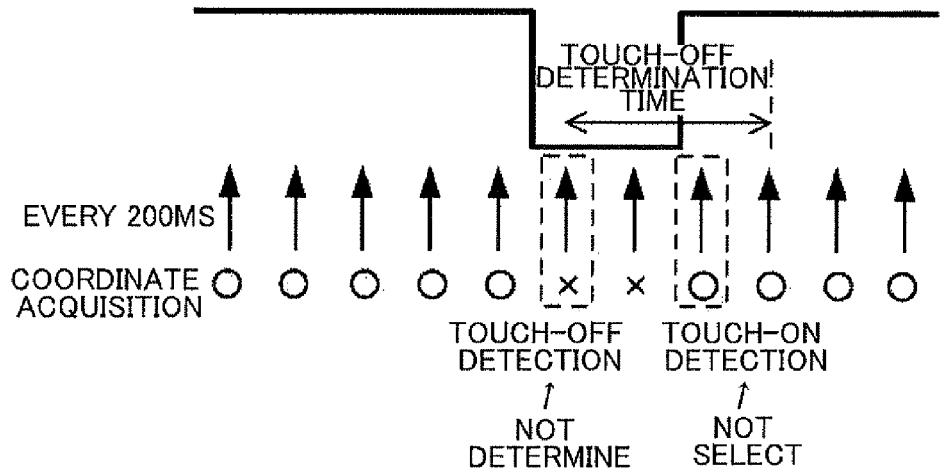
FIGS. 12A and 12B show processings executed in the navigation device if a touch-off and a touch-on were detected.

By performing the above-mentioned processing, as shown in FIG. 12A, after the touch-off was detected, if the touch-on was detected before the touch-off determination time passes, the touch-off is not determined but the state where the selectable object is selected is maintained. For example, if the drag operation is being performed, the scroll-display or the moving-display of the selectable object continues performed. In addition, a selectable object different from the map image is not selected based on the touch-on. Consequently, as shown in FIG. 9 for example, when the user performs a touch-on at a coordinate Z1 on the map image 61, and after the map image 61 is selected, drags by moving his or her finger along an arrow 72. In such a case, even if the finger of the user or the like lifts up from the touch panel at a point Z2 or the pressure the touch panel is pressed is reduced during dragging, the touch-off at the point Z2 is not determined. Therefore, it does not occur that the selection of the map image 61 is cancelled at the point Z2 and the scroll stops, and/or the button 71 including a point Z3 where the touch-on was detected and that is located in the vicinity of the point Z2 is selected against the user's intention.

Figure 12B:
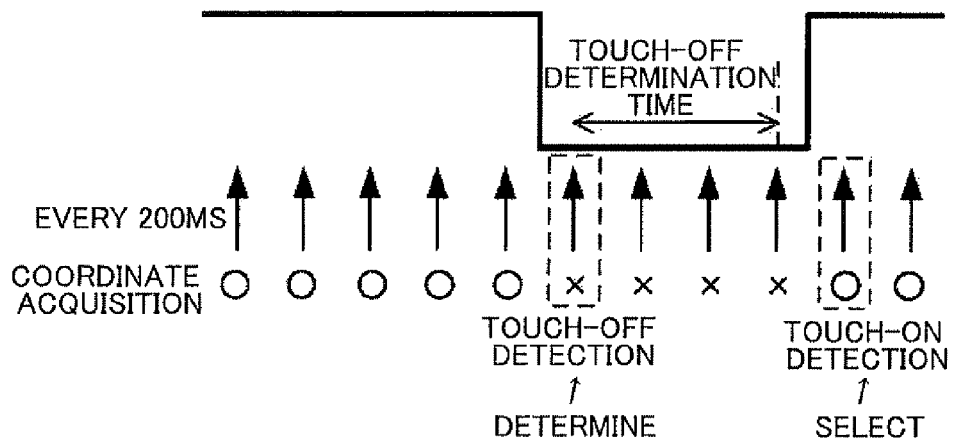
Figure 13:
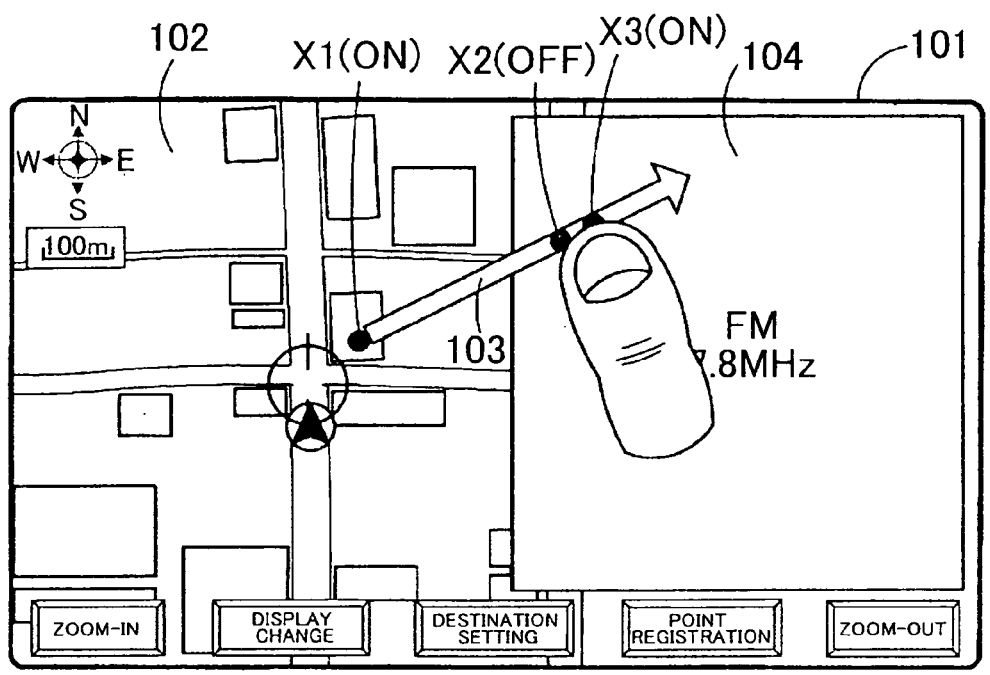
FIG. 13 illustrates a problem in a prior art.

On the other hand, as shown in FIG. 12B, if the touch-on was detected after the touch-off determination time has passed, the touch-off is determined and a new selectable object is selected based on the touch-on. Consequently, as shown in FIG. 9 for example, when the user performs a touch-on at the coordinate Z1 on the map image 61, and after the map image 61 is selected, drags by moving his or her finger along the arrow 72. Then, if the finger of the user or the like lifts up from the touch panel at the point Z2 or the pressure the touch panel is pressed is reduced during dragging, the touch-off at the point Z2 is determined. As a result, the selection of the map image 61 is cancelled at the point Z2 and the scroll stops. In addition, a new touch-on is detected at the point Z3 that is located in the vicinity of the point Z2. Therefore, the button 71 including the point Z3 where the touch-on was detected is selected against the user's intention.

In addition, in the navigation device 1, the scroll-display is performed even after the touch-off such that the scroll continues for a predetermined time in the scroll direction before the touch-off. Generally, the time for which the scroll continues after the touch-off is longer as the drag speed just before the touch-off is faster (that is, the scroll speed is faster). Consequently, setting the touch-off determination time longer if the moving speed of the touch coordinate just before the touch-off is fast increases possibility of a new touch-on being detected before the touch-off determination time passes even when the touch-off that the user does not intend has been detected during the drag operation. Therefore, it is less likely that the map image 61 stops during the scroll-display or the displayed position of the map image 61 skips. On the other hand, when setting the touch-off determination time long if the moving speed of the touch coordinate just before the touch-off is slow, it is likely that the map image 61 stops during the scroll-display or the displayed position of the map image 61 skips.

As explained in detail above, in the navigation device 1 according to the present example, a touch panel operation method in the navigation device 1, and a computer program that is executed in the navigation device 1, if the touch-off has been detected, the touch coordinates for a predetermined time before the touch-off was detected are acquired (S12); it is judged based on the acquired touch coordinates whether the touch coordinate is displaced for the predetermined time before the touch-off was detected (S13); if it has been judged that the touch coordinate is displaced, the touch-off determination time is set longer than if it has been judged that the touch coordinate is not displaced (S14, S18, S19, S21, and S22). If the state in which the user is not touching the touch panel has continued for the touch-off determination time or more after the touch-off was detected, the touch-off is determined (S34). Therefore, the most appropriate touch-off determination time can be set based on the operation manner of the user on the touch panel 14. As a result, in a normal situation, the touch-off determination time from the touch-off detection to the touch-off determination is never set longer than necessary, thereby not leading to the worsening of the operability. In addition, in a situation in which the touch-off that the user does not intend is likely to be detected, the touch-off determination time from the touch-off detection to the touch-off determination is set longer. Therefore, it is possible to prevent the stop of the scroll-display and/or the selection of the selectable object that the user does not intend.

In addition, as the displacement amount of the touch coordinate just before the touch-off is larger, the touch-off determination time is set longer (S14, S18, S19, S21, and S22). Therefore, for example, in a situation in which the touch-off that the user does not intend is likely to be detected such as the drag operation at a high speed, the touch-off determination time from the touch-off detection to the touch-off determination can be set longer. As a result, it is possible to prevent the stop of the scroll-display and/or the selection of the selectable object that the user does not intend. In addition, the touch-off determination time is set longer as the scroll-display speed of the selectable object is faster. Therefore, even if the touch-off has been detected during the scroll-display, it is possible to smoothly scroll the selectable object without the scroll-display being stopped before the touch-off is determined.

In addition, if the touch-off has been detected in a predetermined area where a predetermined function that the user does not intend can be executed based on the touch-on after the touch-off has been determined, the touch-off determination time from the touch-off detection to the touch-off determination is set longer. Therefore, it is possible to prevent the predetermined function that the user does not intend from being executed.

The present example is not limited to the present example, but various improvements and modifications may be made without departing from the broad spirit and scope of the underlying principles.

For example, in the touch-off provisional determination processing program (FIG. 7), any one or a plurality of the processings at S16, S17, and S20 may not be omitted. In addition, the respective values of the first touch-off determination time, the second touch-off determination time, the third touch-off determination time, the fourth touch-off determination time, and the fifth touch-off determination time may be other values, provided that a condition of "the first touch-off determination time<the second touch-off determination time<the third touch-off determination time<the fourth touch-off determination time<the fifth touch-off determination time" is met.

In the present example, the predetermined area is an area where a function that the user does not intend can be executed by determining the touch-off. However, the predetermined area may be another area.

In the present example, if it has been judged that the touch coordinate just before the touch-off was detected is located in the predetermined area, the touch-off determination time is set longer than if it has been judged that the touch coordinate is not located in the predetermined area. However, also if the touch coordinate just before the touch-off was detected is not located in the predetermined area but it is predicted that the touch coordinate may be moved to the predetermined area within a predetermined time (for example, 0.6 sec.), the touch-off determination time may be set longer. The case where it is predicted that the touch coordinate may be moved to the predetermined area within a predetermined time corresponds to, for example, a case where the touch coordinate just before the touch-off was detected was located in the vicinity of the predetermined area and was being displaced toward the predetermined area, and the like.

The present example can be applied, in addition to the navigation device, to a device provided with a touch panel serving as an operation unit. For example, the present example can be applied to a mobile device such as a cellular phone, a personal computer, a mobile music player, and the like. The system of the touch panel to be applied is not limited, but a resistive system, a surface acoustic wave system, an infrared ray system, an electro magnetic induction system, a capacitance system, or the like can be applied to various kinds of touch panels. Especially, in case of the resistive system, a greater effect can be obtained because a certain pressure level or more is required for a detection of the touch-on, thereby the possibility of the touch-off that the user does not intend being detected is increased.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A touch panel operation device, comprising:
   a display device configured to display selectable objects;
   a touch panel that is located on a display area of the display device and is configured to accept a touch operation of a user; and
   a controller that:
      detects a touch-on, the touch-on being a transition from state at which the touch panel detects the user not touching the touch panel to a state at which the touch panel detects the user touching the touch panel;
      detects a touch-off, the touch off being a transition from the state at which the touch panel detects the user touching the touch panel to the state at which the touch panel detects the user not touching the touch panel;
      sets a touch-off determination time;
      determines that the touch-off has occurred if the state at which the touch panel detects the user not touching the touch panel has continued for the set touch-off determination time or more after the touch-off was detected;
      when the user is touching the touch panel, acquires a touch coordinate that is a coordinate of a point on the touch panel that the user has touched;
      selects a selectable object corresponding to the acquired touch coordinate;
      scroll-displays on the display device the selected selectable object, based on a displacement of the acquired touch coordinate;
      determines whether the touch coordinate was acquired and displaced just before the touch-off was detected; and if the touch coordinate was acquired and displaced just before the touch-off was detected, sets the touch-off determination time to be longer than if the touch coordinate was acquired and not displaced just before the touch-off was detected.

2. The touch panel operation device according to claim 1, wherein the controller:
   acquires a displacement amount of the acquired touch coordinate just before the touch-off was detected; and
   sets the touch-off determination time based on the acquired displacement amount.

3. The touch panel operation device according to claim 2, wherein the controller:
   sets the touch-off determination time to be longer when the acquired displacement amount becomes larger.

4. The touch panel operation device according to claim 1, wherein:
   the touch coordinate is acquired just before the touch-off is detected; and
   the controller:
      when the touch-off has been detected, determines whether the acquired touch coordinate is located in a predetermined area in the display area; and if the acquired touch coordinate is located in the predetermined area, sets the touch-off determination time longer than if the touch-coordinate is not located in the predetermined area.

5. The touch panel operation device according to claim 4, wherein:
the touch coordinate is acquired when the touch-on is detected; and
the controller:
when the touch-on has been detected, determines whether the acquired touch coordinate is located in the predetermined area in the display area; and
if acquired touch coordinate is located in the predetermined area, executes a predetermined function corresponding to the predetermined area.

6. The touch panel operation device according to claim 1, wherein the controller:
only stops the scroll-display when it is determined that the touch-off has occurred.

7. A navigation device comprising the touch panel operation device according to claim 1.

8. A touch panel operation method comprising:
displaying selectable objects;
providing a touch panel that is located on a display area of the display device and is configured to accept a touch operation of a user; and
detecting a touch-on, the touch-on being a transition from state at which the touch panel detects the user not touching the touch panel to a state at which the touch panel detects the user touching the touch panel;
detecting a touch-off, the touch off being a transition from the state at which the touch panel detects the user touching the touch panel to the state at which the touch panel detects the user not touching the touch panel;
setting a touch-off determination time;
determining that the touch-off has occurred if the state at which the touch panel detects the user not touching the touch panel has continued for the set touch-off determination time or more after the touch-off was detected;
when the user is touching the touch panel, acquiring a touch coordinate that is a coordinate of a point on the touch panel that the user has touched;
selecting a selectable object corresponding to the acquired touch coordinate;
scroll-displaying on the display device the selected selectable object, based on a displacement of the acquired touch coordinate;
determining whether the touch coordinate was acquired and displaced just before the touch-off was detected; and
if the touch coordinate was acquired and displaced just before the touch-off was detected, setting the touch-off determination time to be longer than if the touch coordinate was acquired and not displaced just before the touch-off was detected.

9. The touch panel operation method according to claim 8, further comprising:
acquiring a displacement amount of the acquired touch coordinate just before the touch-off was detected; and
setting the touch-off determination time based on the acquired displacement amount.

10. The touch panel operation method according to claim 9, further comprising:
setting the touch-off determination time to be longer when the acquired displacement amount becomes larger.

11. The touch panel operation method according to claim 8, further comprising:
acquiring the touch coordinate just before the touch-off is detected; and
when the touch-off has been detected, determining whether the acquired touch coordinate is located in a predetermined area in the display area; and
if the acquired touch coordinate is located in the predetermined area, setting the touch-off determination time longer than if the touch-coordinate is not located in the predetermined area.

12. The touch panel operation method according to claim 11, further comprising:
acquiring the touch coordinate when the touch-on is detected; and
when the touch-on has been detected, determining whether the acquired touch coordinate is located in the predetermined area in the display area; and
if acquired touch coordinate is located in the predetermined area, executing a predetermined function corresponding to the predetermined area.

13. The touch panel operation method according to claim 8, further comprising:
only stopping the scroll-display when it is determined that the touch-off has occurred.

14. The touch panel operation method according to claim 8, wherein the method is performed by a navigation device.

15. A non-transitory computer-readable storage medium storing a computer-executable program for touch panel operation, the program comprising:
instructions for displaying selectable objects;
instructions for providing a touch panel that is located on a display area of the display device and is configured to accept a touch operation of a user; and
instructions for detecting a touch-on, the touch-on being a transition from state at which the touch panel detects the user not touching the touch panel to a state at which the touch panel detects the user touching the touch panel;
instructions for detecting a touch-off, the touch off being a transition from the state at which the touch panel detects the user touching the touch panel to the state at which the touch panel detects the user not touching the touch panel;
instructions for setting a touch-off determination time;
instructions for determining that the touch-off has occurred if the state at which the touch panel detects the user not touching the touch panel has continued for the set touch-off determination time or more after the touch-off was detected;
instructions for, when the user is touching the touch panel, acquiring a touch coordinate that is a coordinate of a point on the touch panel that the user has touched;
instructions for selecting a selectable object corresponding to the acquired touch coordinate;
instructions for scroll-displaying on the display device the selected selectable object, based on a displacement of the acquired touch coordinate;
instructions for determining whether the touch coordinate was acquired and displaced just before the touch-off was detected; and
instructions for, if the touch coordinate was acquired and displaced just before the touch-off was detected, setting the touch-off determination time to be longer than if the touch coordinate was acquired and not displaced just before the touch-off was detected.

16. The non-transitory computer-readable storage medium according to claim 15, the program further comprising:

instructions for acquiring a displacement amount of the acquired touch coordinate just before the touch-off was detected; and instructions for setting the touch-off determination time based on the acquired displacement amount.

17. The non-transitory computer-readable storage medium according to claim 16, the program further comprising:

instructions for setting the touch-off determination time to be longer when the acquired displacement amount becomes larger.

18. The non-transitory computer-readable storage medium according to claim 15, the program further comprising:

instructions for acquiring the touch coordinate just before the touch-off is detected; and instructions for, when the touch-off has been detected, determining whether the acquired touch coordinate is located in a predetermined area in the display area; and instructions for, if the acquired touch coordinate is located in the predetermined area, setting the touch-off determination time longer than if the touch-coordinate is not located in the predetermined area.

19. The non-transitory computer-readable storage medium according to claim 18, the program further comprising:

instructions for acquiring the touch coordinate when the touch-on is detected; and instructions for, when the touch-on has been detected, determining whether the acquired touch coordinate is located in the predetermined area in the display area; and instructions for, if acquired touch coordinate is located in the predetermined area, executing a predetermined function corresponding to the predetermined area.

20. The non-transitory computer-readable storage medium according to claim 15, the program further comprising:

instructions for, only stopping the scroll-display when it is determined that the touch-off has occurred.

* * * * *